Oct. 30, 1934.    A. O. CODNEY    1,978,449
CHARGING PLUG
Filed Aug. 4, 1931
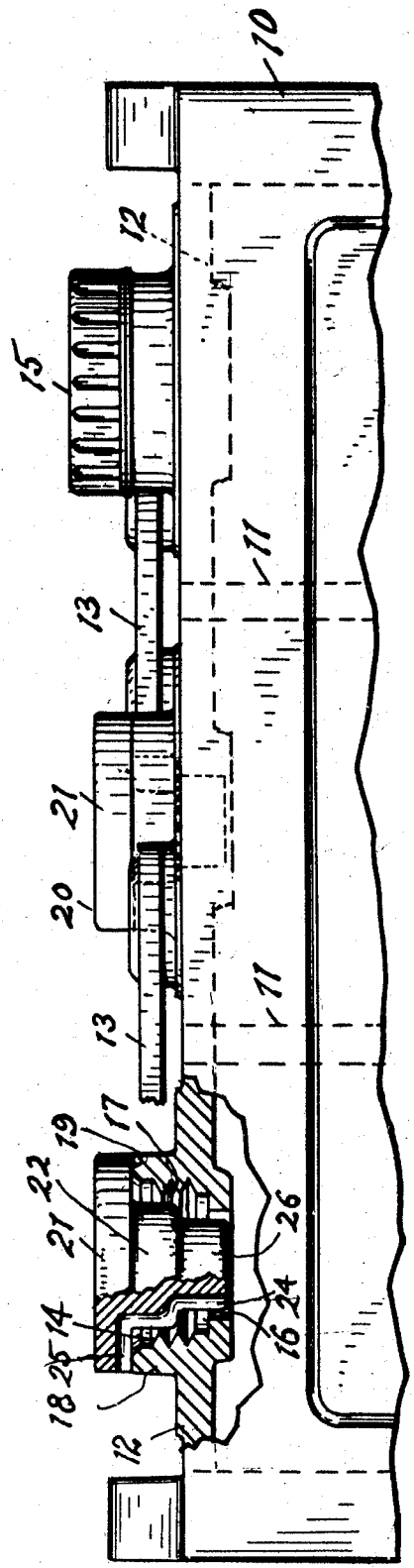
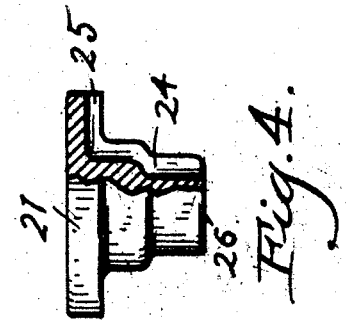
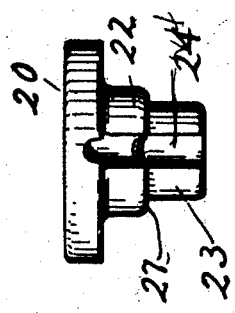
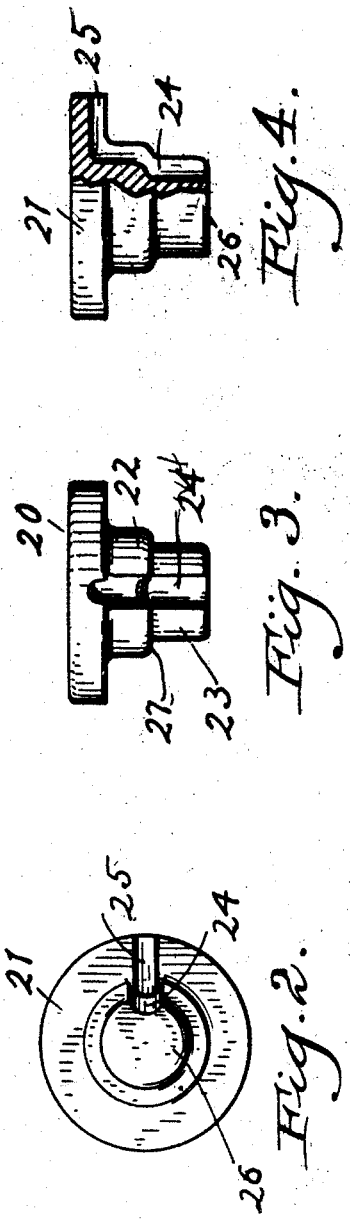

Patented Oct. 30, 1934

1,978,449

UNITED STATES PATENT OFFICE 1,978,449

CHARGING PLUG

Arthur O. Codney, Cleveland Heights, Ohio, assignor to Willard Storage Battery Company, Cleveland, Ohio, a corporation of West Virginia Application August 4, 1931, Serial No. 555,020

2 Claims. (Cl. 136—177)

This invention relates to storage batteries and more particularly to a charging plug adapted for use in place of the usual vent plug of a storage battery during charging operations.

Due to the fact that during the charging operation of a storage battery it is necessary to take specific gravity reading, access for which is through the vent openings, and at other times requires these openings to be substantially closed or covered to prevent the escapement of acid spray but at the same time permit the escape of gases which form and would cause injury to the battery, it is desirable to have a charging plug which will efficiently meet these requirements.

It is therefore an object of the present invention to provide a charging plug which is simple and light in construction, well balanced so as not to be accidentally disengaged from the vent opening, and capable of being readily and speedily removed or replaced when required.

With the objects above indicated and other objects hereinafter explained in view, the invention consists in the construction and combination of elements hereinafter described and claimed.

Referring to the drawing,

Figure 1 is a fragmentary side elevational view of a storage battery, partly in section so as to more clearly show the embodiments of the present invention;

Fig. 2 is a bottom plan view of a charging plug embodying the present invention;

Fig. 3 is a side elevational view of the same;

Fig. 4 is a side elevational view on a different plane, a portion of which is in section to show the groove more clearly.

In the drawing, 10 represents the usual type of storage battery container or box composed of hard rubber or other suitable material. The container is divided by partitions 11 so as to provide the desired number of cells, three being herein illustrated, for receiving the groups of positive and negative plates and the electrolyte. The container 10 is provided with a plurality of covers 12 which are secured in any desirable manner within the open upper portions of the container and the upper portions of the partitions 11, each being adapted to close its respective cell. The groups of plates in each cell are supported in the usual manner by having the posts connected therewith supported in the associated cover and the free ends extending beyond or above where the posts of adjacent cells are connected in the usual manner by straps or connectors 13. Vent openings 14 are provided in the covers 12 directly over each cell and are usually internally screw-threaded to receive a screw-threaded vent plug 15. These vent plugs are provided so that access into the associated cells may be had for the purpose of adding an electrolyte or taking specific gravity readings by means of the well known hydrometer syringe.

The details of construction so far described are common in the various types of storage batteries and form no part of the present invention per se but only in combination with a charging plug which will be hereinafter more fully described.

In the charging of storage batteries either originally or at later periods in service stations, there are always certain inconveniences and dangers associated therewith. For instance, in high rate charging, if the usual vent plug, such as shown at 15, is secured into the vent opening, there is a danger of an explosion if a flame or spark approaches the pocketed gas which is generated. Then again if the vent plug is placed over the vent openings without screwing it into place, the majority of the spray or minute acid bubbles which are projected above the surface of the sulphuric acid electrolyte in the cell will seep out and onto the top of the battery which will be likely to cause damage due to the characteristic of the solution, but at any rate will mar or disfigure the top of the battery as well as cause corrosion of surrounding apparatus.

Another disadvantage resides in the possibility of loss of the vent plugs due to their being easily knocked off or disengaged from the vent openings.

It is the purpose of the present invention to produce a charging plug having certain characteristics which will effectively overcome the disadvantages heretofore set forth.

In Fig. 1 of the drawing, the vent opening shown in section consists of what will be termed a lower vent opening 16 of rather small diameter which communicates with the cell through the cover 12. Directly above and coaxial therewith is an opening 17 of somewhat larger diameter which is interiorly screw-threaded and of substantially greater depth than the depth of the opening 16. A circular flange 18 integral with the cover 12 extends around the opening 17 and has a flat transverse top surface or edge 19. The usual screw-threaded vent plug 15 cooperates with the screw-threaded opening 14 and, when properly positioned, the head or cap of the vent plug engages the top surface 19 so as to close the vent opening against the escapement of the acid from within the cell.

The charging plug embodying the present invention is adapted to be used in place of the usual vent plug 15 during the charging operations. It consists of a readily detachable and freely supported plug 20 formed of any suitable light material, such as hard rubber, having a circular, relatively flat head or cap portion 21 of sufficient diameter to suitably rest upon the top surface 19 of the flange 18 surrounding the vent opening 14. Coaxial and integral with the under side of the cap is a circular extension or stem 22 of a diameter slightly less than the inner diameter of the vent opening 14 and extending downwardly within the interior screw-threads so as to prevent any appreciable lateral movement of the plug 20 within the vent opening. An extended or lowermost portion 23 is formed integral with the portion 22 and likewise is disposed coaxially with respect thereto and is of sufficient depth to extend to adjacent the lower edge of the lower vent opening 16 as shown in Fig. 1 when the cap 21 is resting upon the top surface 19 in its supported position. The lowermost portion 23 of the stem 22 is of slightly less diameter than the stem portion 22 so as to be freely disposed within the lower vent opening 16 but close enough to the walls thereof to prevent any appreciable quantity of acid spray from passing therebetween.

A groove 24 extends upwardly throughout the lower portion 23 and the portion 22 of the stem and communicates with a radially extending groove 25 upon the under side of the cap 21. This groove permits the escapement of gas which is generated within the cell with which it is associated and reduces the possibility of any explosion occurring within the cell.

The charging plug described has the following advantages. The lower portion 23 of the stem, being of slightly less diameter than the diameter of the lower vent opening 16 and the under surface extending adjacent the lower portion of the vent opening, tends to prevent the escapement of the majority of the acid spray and fumes ordinarily evolved from the plates during the charging operation. These acid bubbles coming into contact with the lower portion 26 of the stem burst, with the result that the acid returns to the cell.

A small portion of the spray and fumes passes between the lower portion 23 of the stem and the opening 16 but is prevented from escapement to the exterior of the battery by reason of the offset shoulder 27 formed by reason of the difference in diameters of the lower portion 23 and the upper portion 22 of the stem. The diameter of the upper portion 22 of the stem is greater than the diameter of the lower vent opening 16 so that any spray or fumes which pass between the lower portion 23 of the stem and the opening 16 will burst and, being condensed, the acid will drip back into the cell. This keeps the upper part 22 of the stem and the under side of the cap 21 practically dry and substantially prevents any leakage of acid out through the vent opening.

The increased diameter of the upper portion 22 of the stem and the depth to which it extends below the cap 21 and consequently below the point where the plug is supported by the upper edge 19 of the flange 18 lowers the center of gravity of the plug to such an extent that it is not readily disengaged from the vent opening by accidental contact therewith. Furthermore, enlarging the diameter of the upper portion 22 of the stem to a point adjacent the inner diameter of the upper vent opening 14 prevents any appreciable lateral movement of the charging plug within the vent opening and adds sufficient additional weight to the plug as to substantially prevent accidental disengagement between the charging plug and the vent opening.

While I have described the preferred embodiments of the invention, it is to be understood that I am not to be limited thereto inasmuch as changes and modifications may be resorted to without departing from the spirit of the invention as defined in the appended claims.

Having thus described my invention, I claim:

1. The combination with a storage battery container having a flanged vent opening interiorly screw-threaded and a plain opening of lesser diameter below the threaded opening, of a freely removable charging plug adapted to close said vent opening, said plug comprising a cap portion resting upon the flange around the vent opening, and an integral plain stem portion extending downwardly within said vent opening and in spaced relation with respect to the side walls thereof, the said stem portion being of reduced diameter at its lower end to provide a laterally extending surface above the plain opening and such reduced lower end being extended into said plain opening, said cap portion having an opening at the lateral side thereof and a groove in its under side connecting the last mentioned opening with the space between said plain stem portion and the sides of the threaded and plain openings.

2. The combination with a storage battery container having a flanged vent opening interiorly screw-threaded and a plain opening of lesser diameter below the threaded opening, of a freely removable charging plug adapted to close said vent opening, said plug comprising a cap portion resting upon the flange around the vent opening, and an integral plain stem portion extending downwardly within said vent opening and in spaced relation with respect to the side walls thereof, said stem portion being of reduced diameter at its free end to provide a laterally extending surface above the plain opening and such reduced free end being extended into said plain opening, said cap portion and said stem portion being provided with a continuous groove having an opening to atmosphere at the lateral side of the cap portion and which groove extends laterally upon the under side of said cap portion and downwardly along the outer side of said stem portion.

ARTHUR O. CODNEY.